(12) United States Patent
Storey et al.

(10) Patent No.: US 8,446,677 B2
(45) Date of Patent: May 21, 2013

(54) VALVE DEVICE FOR A VARIABLE FOCUS LENS

(75) Inventors: Gregor Storey, Oxford (GB); William Johnson, Oxford (GB)

(73) Assignee: Adlens Ltd., Oxford (GB)

( * ) Notice: Subject to any disclaimer, the term of this patent is extended or adjusted under 35 U.S.C. 154(b) by 116 days.

(21) Appl. No.: 12/920,773

(22) PCT Filed: Mar. 4, 2009

(86) PCT No.: PCT/GB2009/000594
§ 371 (c)(1),
(2), (4) Date: Dec. 13, 2010

(87) PCT Pub. No.: WO2009/109749
PCT Pub. Date: Sep. 11, 2009

(65) Prior Publication Data
US 2012/0057245 A1    Mar. 8, 2012

(30) Foreign Application Priority Data

Mar. 4, 2008 (GB) .................................. 0804091.7
Jan. 15, 2009 (GB) .................................. 0900639.6

(51) Int. Cl.
*G02B 1/06* (2006.01)
*G02B 3/12* (2006.01)

(52) U.S. Cl.
USPC .......................................... 359/666; 359/665

(58) Field of Classification Search
USPC ................................................ 359/665, 666
See application file for complete search history.

(56) References Cited

U.S. PATENT DOCUMENTS

| 532,990 A | 1/1895 | Rau |
| 1,515,389 A | 11/1924 | Hopkins |
| 4,582,398 A | 4/1986 | Roberts et al. |
| 5,178,186 A | 1/1993 | Levasseur |
| 2003/0095336 A1 | 5/2003 | Floyd |
| 2004/0011397 A1 | 1/2004 | Jacoway |
| 2006/0250699 A1 | 11/2006 | Silver |

FOREIGN PATENT DOCUMENTS

| DE | 4217853 | 12/1993 |
| DE | 19938191 | 2/2001 |
| DE | 10102906 A1 | 7/2002 |
| EP | 0172026 | 2/1986 |
| EP | 1623688 | 2/2006 |
| FR | 1602997 | 3/1971 |
| GB | 26014 | 0/1904 |
| GB | 258325 | 9/1926 |
| GB | 571912 A | 9/1945 |
| GB | 993779 A | 6/1965 |
| JP | 04285907 A | 10/1992 |
| WO | 9638744 | 12/1996 |

(Continued)

OTHER PUBLICATIONS

International Search Report; PCT/GB2009/000594; Apr. 29, 2009.

*Primary Examiner* — William Choi
(74) *Attorney, Agent, or Firm* — Mintz Levin Cohn Ferris Glovsky and Popeo, P.C.

(57) ABSTRACT

A valve device for a variable lens comprises: an inlet for receiving fluid from a reservoir; an outlet for passing fluid to a lens cavity; and a valve member, the valve member comprising a passageway for fluid communication between the inlet and outlet and a valve for closing the passageway; wherein the valve is actuated by turning the valve member about an axis of rotation and the passageway extends along the valve member in the axial direction.

20 Claims, 11 Drawing Sheets

FOREIGN PATENT DOCUMENTS

| | | |
|---|---|---|
| WO | 9811458 | 3/1998 |
| WO | 9947948 | 9/1999 |
| WO | 0175510 | 10/2001 |
| WO | 02063353 | 8/2002 |
| WO | 2007049058 | 5/2007 |
| WO | 2008050114 | 5/2008 |

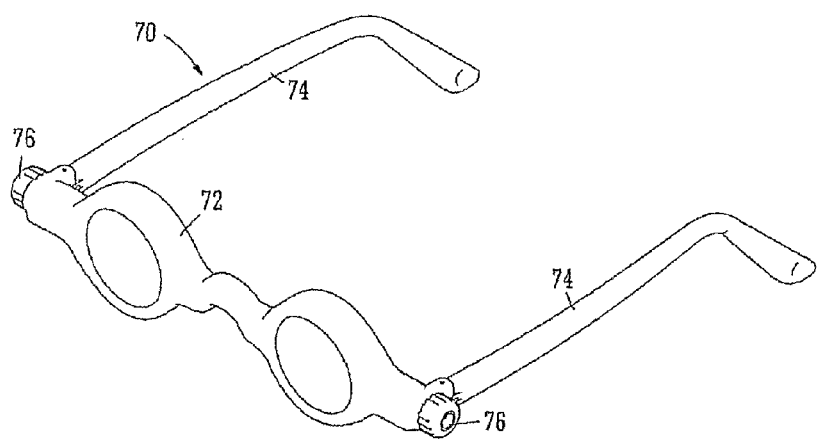
Fig. 11
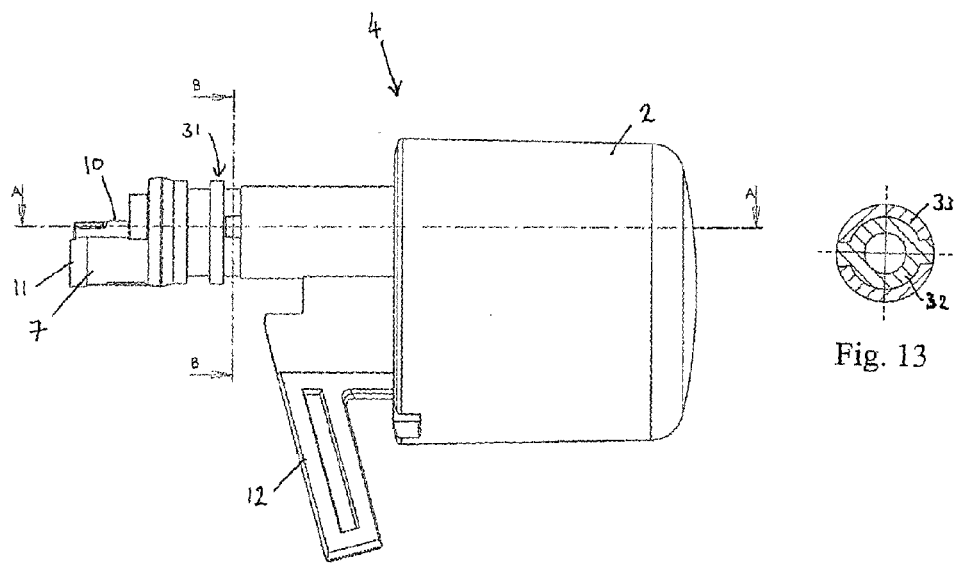
Fig. 12
Fig. 13

VALVE DEVICE FOR A VARIABLE FOCUS LENS

FIELD

The disclosure relates to a valve device for a variable focus lens.

BACKGROUND

Variable focus lenses are known, as disclosed in WO 96/38744 and WO 99/47948 for example. They normally consist of a liquid-filled chamber, at least one face of which is formed by a transparent flexible membrane, for example a Mylar membrane. As liquid is added to or removed from the chamber, the flexible membrane is deformed, and its curvature accordingly changes. This change in curvature leads to a change in the optical characteristics and power of the lens. The power of the lens can thus be varied by varying the amount of liquid in the chamber.

In WO 96/38744, the amount of fluid in the lens is adjusted by inserting a syringe through a bung, and using the syringe to add or withdraw fluid. If this lens is to be used in spectacles, the spectacle frames for the lenses must allow the lens to be accessed by the syringe. The fluid connections makes the spectacles and lenses complex and bulky. Thus, it will be appreciated that use of this lens can be rather inconvenient in some circumstances. A syringe can also be difficult to control accurately, leading to a corresponding reduction in accuracy of the adjustment of the lens To address some of these issues, WO 99/47948 proposed various arrangements including some alternatives to the use of a syringe. These included a range of methods for displacing a syringe type piston or plunger in a reservoir to pump fluid into the lens chamber, and also the use of a barrel with an external thread, and a cap with an internal thread mounted at one end of the barrel. By using a thread, turning the cap can adjust the volume of a fluid reservoir defined within the barrel and cap, and this can be used to pump fluid into and out of the fluid chamber in the lens.

However, although these alternatives enable improvements in the ease of control of the lens, the adjustment mechanism is still bulky and complex.

Reservoirs of reduced size can be used to avoid the problem of bulk, but this limits the range of adjustment that can be applied to the lens, and thus limits the use of the lens. In order to enable the lens to be adjusted to a wide range of powers and thus address a wide range of vision problems, a reservoir of large size must be used.

In an attempt to provide this capability without a cumbersome spectacle design, WO 99/47948 discloses mechanisms for sealing and disconnecting the reservoir. This means that a large reservoir can be removed from the lens after the desired adjustment has been carried out. In one embodiment a screw thread is used to compress a pipe to seal it, and the pipe is then cut to allow a reservoir to be removed. In another embodiment the device for compressing the pipe is a button that is pressed onto the pipe. The button includes a cutting blade, that presses onto and cuts the pipe once depression of the button has compressed and sealed the pipe. However, whilst these mechanisms enable removal of the large fluid reservoir, they still require a complex and inconvenient connection between the reservoir and the lens, as well as a complicated procedure to remove the reservoir.

SUMMARY

Viewed from a first aspect, the disclosure provides a valve device for a variable lens, the device comprising: an inlet for receiving fluid from a reservoir; an outlet for passing fluid to a lens cavity; and a valve member, the valve member comprising a passageway for fluid communication between the inlet and outlet and a valve for closing the passageway; wherein the valve is actuated by turning the valve member about an axis of rotation and the passageway extends along the valve member in the axial direction.

By having a valve member that includes a passageway between a reservoir and a lens cavity, where rotation of the valve member closes the passageway, a compact device is produced. In contrast to other valve types the passage of fluid is through the valve member, along the axial direction, and so the inlet or outlet of the valve can connect simply to conduits for the cavity or reservoir. As will be appreciated, in the case of use with a variable lens, a reservoir can be rotated relative to the lens without any disadvantageous effect, and so the outlet may be on the rotating valve member, without the need for a swivelling joint. A valve of this type needs only one moving part and can be manufactured and assembled easily. A connection between a reservoir and a lens can be made using the valve member without the need for intervening fluid conduits. To further increase the ease of manufacture, the inlet and/or a portion of the passageway may be formed of a bore along the valve member in the axial direction thereof.

The valve member may be mounted within a valve chamber, and the valve member and valve chamber may be generally cylindrical. A cylindrical valve member mounted within a cylindrical valve chamber provides a convenient rotatable valve structure. The valve chamber may include the outlet. Advantageously, the valve chamber may be formed integrally with the lens structure, i.e. as a part of the lens structure. The valve chamber may be formed on an outer wall of the lens, which may be an outer ring of the lens in the case of a circular lens. This avoids the need for a connection between the valve chamber and lens structure during the assembly process.

The compact arrangement of the valve device means that the portion that remains after the reservoir is removed is small, and when used with spectacles this means that the spectacles are lighter and easier to handle than spectacles with prior art valve devices.

To separate the reservoir from the lens the valve member can be cut. However, the valve device includes a releasable connection between the valve member and the reservoir. In one embodiment, this takes the form of a friction fit of a plug into a socket, such as a cylindrical projection for connection with a cylindrical recess. The plug may extend from the reservoir and the socket is formed in the valve member. The socket can hence be recessed into the spectacle frame. The plug and socket arrangement may be provided with a keyway arrangement for preventing rotation of the plug within the socket. Thus, a cylindrical plug may include a lug for engagement with a notch in the socket. Alternatively a plug and socket of non-circular cross-section may be used.

In an alternative embodiment, the valve member is arranged to be broken at a point between the valve and the inlet to thereby disconnect a reservoir. This avoids the need for additional cutting tools or implements.

To facilitate breaking of the valve member it may include a breaking point between the valve and the inlet. Such a breaking point may be an area of material of reduced thickness or strength. In exemplary embodiments the breaking point comprises a stress concentrator such as a cut or notch. A breaking point makes breaking the valve member easier, and also ensures that the breakage occurs in the required location.

The breaking point may be arranged to cause failure of the material of the valve member when it is subjected to a bending moment. In an exemplary embodiment, this may be a moment acting around an axis normal to the axis of rotation.

Alternatively, the breaking point may be arranged such that a moment applied about the axis of rotation when the valve is closed will break the valve member, i.e. a twisting around the axis of rotation. This means that the user can close the valve and break the valve member to disconnect the inlet and reservoir by a single twisting motion. As the rotation to break the valve member will close the valve, this arrangement also ensures that the valve is closed before breaking, preventing accidental disconnection of the reservoir with the valve open and ensuring that the variable lens is permanently adjusted to the desired strength when disconnection occurs. With this arrangement, the valve member may engage with a stop on the valve chamber when the valve is closed. Thus, rotational shear stress in the valve member due to the continued twisting motion causes the failure at the breaking point.

In a further alternative, the valve member may be arranged to fail under tensile stress along the axis of rotation.

In an exemplary embodiment, the valve member includes a bore through the cylinder, which forms a part of the passageway and provides fluid communication between the inlet and a cut-away section of the cylinder at one end. A valve seal is at the same end of the cylinder. The outlet is formed in an end face of the cylindrical valve chamber, and is placed offset from centre of rotation of the valve member so as to be adjacent to the cut-away when the valve member is in an open state, thus enabling fluid communication between the inlet and outlet along a passageway formed by the bore and the cut-away section. When the valve member is rotated to a closed state the seal prevents fluid communication between the outlet and the inlet by covering the outlet.

With this arrangement, the valve can be opened and closed by rotating the valve member about a part of a circle. Depending on the relative positioning of the seal and cut-away, the valve may be in the open and closed state for differing proportions of its rotation. A convenient arrangement uses a seal that extends across around half of the cylinder, and an outlet that is offset from the centre of the face of the valve chamber. The seal thus covers and closes the outlet during a first 180° of the valve member's rotation, and the outlet is adjacent the cut-away for a second 180° of rotation.

A stop may be provided to prevent full rotation of the valve member, and to positively locate the valve in its open and/or closed states. The stop may be a lug on the valve chamber that engages with an edge of the cut-away of the valve member.

A grip or lever or the like may be provided for applying rotational force to the valve member. This may be a lever arm extending radially outward from the axis of rotation. The use of a lever provides a mechanical advantage to increase the force applied on the valve member, and hence facilitate opening and closing of the valve. Where the reservoir is disconnected by breaking the valve member, the lever may assist breaking of the valve member by rotation either about the valve member axis of rotation or about an axis normal to the axis of rotation. In the latter case, the lever arm should protrude generally along the axis normal to the axis of rotation.

The valve device may be provided with a locking means to prevent unwanted movement of the lever. In an exemplary embodiment the locking means is arranged such that when the device is in use and mounted to spectacles the lever is fixed in place when the side arm of the spectacles is opened. Thus, the lever may be provided with a locking device for engagement with a side arm. In one exemplary embodiment the lever includes a projection or cavity for engagement with a complimentary cavity or projection on the side arm. The projection or cavity should extend parallel to the axis of rotation of the lever. In an alternative embodiment, a clip is provided for engagement with a side arm of the spectacles, the clip including projections for extending along two sides of the lever and for preventing rotation thereof.

The valve device may be incorporated into a lens structure, for example by mounting the valve member in a valve chamber formed integrally with a part of a lens structure as discussed above.

The valve device may include a reservoir for containing fluid, the reservoir connected to the inlet. In an exemplary embodiment the reservoir comprises a dial for adjusting the volume of fluid in the reservoir. The dial may be rotated along the same axis as the axis of rotation of the valve member, or a parallel axis. With this arrangement an ergonomic and intuitive operation of the dial and valve device is achieved. In an exemplary arrangement, the valve member and/or the dial is/are rotated about an axis extending from the region of the temples when the lens is in front of the eye. The reservoir may comprise a dial and a barrel joined by a screw thread to produce an adjustment mechanism. The reservoir may be connected to the inlet by connection of the barrel to the valve member. In this case, the lever may conveniently be formed extending from the barrel.

The reservoir may include a stopping device for preventing over-rotation of the dial. The stopping device may comprise a flexible pawl that is engaged with a notch when rotation of the dial passes a certain point. The flexible pawl may for example be a barb extending from the barrel, which engages in a notch on the dial when the reservoir volume reaches a maximum level. A plurality of stopping devices may be provided about the circumference of the reservoir. The stopping device on the reservoir prevents inadvertent release of fluid from the system by stopping the dial from being unscrewed from the barrel.

A stop may be placed to prevent movement of the valve member when it is open and this stop acts against the turning force of the dial as it is tightened. This arrangement means that an adjustment to the lens power by tightening the dial can be made without any undesirable rotational movement of the valve member.

As will be appreciated from the discussion above, the valve device of the disclosure provides particular advantages when the reservoir it is connected to is a large reservoir for producing large changes in the strength of the associated variable lens. By a large reservoir, a reservoir capable of producing changes in lens power in the range of at least −3 D to +2 D, −4.5 D to +3.5 D being indicated in an exemplary embodiment. For example, for a variable lens of about 35 mm diameter, a reservoir of about 2 ml (2 cm$^3$) in volume in the unadjusted state may be used, and this will produce the desired change of −4.5 D to +3.5 D in lens power with a volume change of −0.4 ml to +0.3 ml. Thus, an exemplary large reservoir can adjust in volume from 1.6 to 2.3 ml. It will be appreciated that such a reservoir could be several centimeters in length, and will protrude from the lens a greater distance than this once the adjustment mechanism is taken into account. The ability to remove this cumbersome reservoir is therefore highly useful, as is the use of a compact valve.

When the valve closes the outlet and the large reservoir is removed, the lens can no longer be adjusted. To further increase the benefits of the disclosure a second aspect of the disclosure provides a valve device as described above, the valve device further comprising a secondary reservoir connected to the outlet, and a secondary adjustment device for adjustment of volume of the secondary reservoir thereby allowing adjustment of the lens when the valve is closed. The valve device hence forms a two-stage adjustment mechanism for a variable lens.

Thus, the valve device enables a first reservoir to be used to carry out a first adjustment, after which the first reservoir can be disconnected. The secondary reservoir and secondary adjustment device can then be used for further adjustment. In an exemplary arrangement, the secondary reservoir is small compared to the first reservoir. Thus, the first, larger, reservoir provides a large range of initial adjustment, and the secondary, smaller, reservoir provides a further, fine adjustment for later use. The further adjustment may be useful for correcting future changes in a user's vision, or for making adjustments to cope with presbyopia. When a user is presbyopic a different degree of correction can be required depending on the distance of the viewed object from the eye.

In an exemplary embodiment, the secondary adjustment device comprises a piston within the reservoir, which can be moved relative to the reservoir to change the volume thereof. The piston may be moved by rotation along a screw thread, or by any other suitable means.

The aspects and exemplary features discussed above are particularly advantageous when used for a variable lens, and thus in exemplary embodiments the disclosure comprises a variable lens including the valve device set out above. However, it will be appreciated that the valve device has benefits in other applications where simple control of fluid flow is required, especially where fluid is passed from a reservoir or other source which can be readily rotated, such that no swivelling connection is required.

Thus, viewed from another aspect, the disclosure provides a valve device comprising: an inlet; an outlet; and a valve member between the inlet and outlet, the valve member comprising a passageway for fluid communication between the inlet and outlet and a valve that closes the passageway; wherein the valve is actuated by turning the valve member about an axis of rotation and the passageway extends along the valve member in the axial direction.

BRIEF DESCRIPTION OF THE FIGURES

Exemplary embodiments of the present disclosure will now be described by way of example only and with reference to the accompanying drawings, in which:

FIG. 11 shows a perspective view of spectacles with the adjustment mechanism of FIG. 10;

FIG. 12 shows a second embodiment of an adjustment and sealing mechanism, which uses an alternative mechanism for detaching the reservoir from the valve member;

FIG. 13 is a cross-section along B-B in FIG. 12;

DETAILED DESCRIPTION

Figure 1:
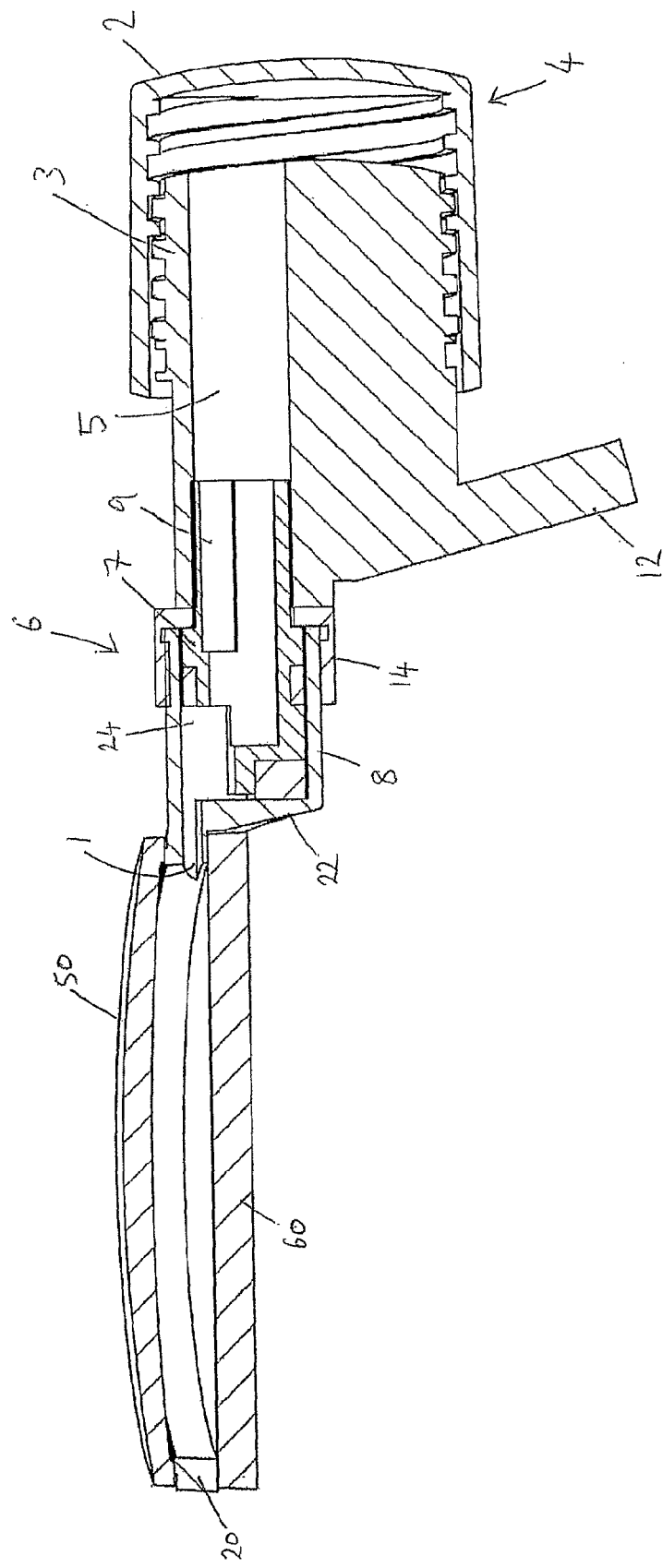
FIG. 1 is a cross-sectional view of a first embodiment of an adjustment and sealing mechanism attached to a lens.

In FIG. 1, a circular lens structure is formed of a plastic ring 20, which has an integral extension 22 with a hollow bore 24 therein. A rear cover 60 is attached to the rear of the ring 20, and a flexible membrane 40 is attached to the front of the ring and a front cover 50 is attached to the front of the lens structure. A flexible membrane, which is not shown, lies within the lens structure and allows adjustment of the lens power. The location of the membrane can be seen from FIG. 9.

The outer ring 20 includes a hole 1 opening into the ring 20 to allow passage of fluid into a cavity of the lens. Fluid is pumped into and out of the lens to adjust the strength of the lens by means of a cup shaped dial 2 fitted with an internal thread that engages with an external thread on a threaded barrel 3. The dial 2 and barrel 3 together form a reservoir 4 for the fluid. A seal is provided between the dial 2 and the barrel 3 to prevent fluid from escaping along the threaded section. The barrel 3 includes a bore 5 that opens into the reservoir 4 at one end, and joins a sealing apparatus 6 at the other end. By turning the dial 2 relative to the barrel 3, the volume of the reservoir 4 is adjusted, which moves fluid along the bore 5 and thence into and out of the cavity of the lens.

The sealing apparatus 6 consists of a valve member 7 located within a valve chamber 8. The valve chamber 8 is formed by the integral extension 22 and bore 24 of the ring 20, and is of a cylindrical shape. The hole 1 opens into a first end of the valve chamber 8, and thus forms an outlet from the valve chamber 8 into the cavity of the variable lens.

Figure 2:
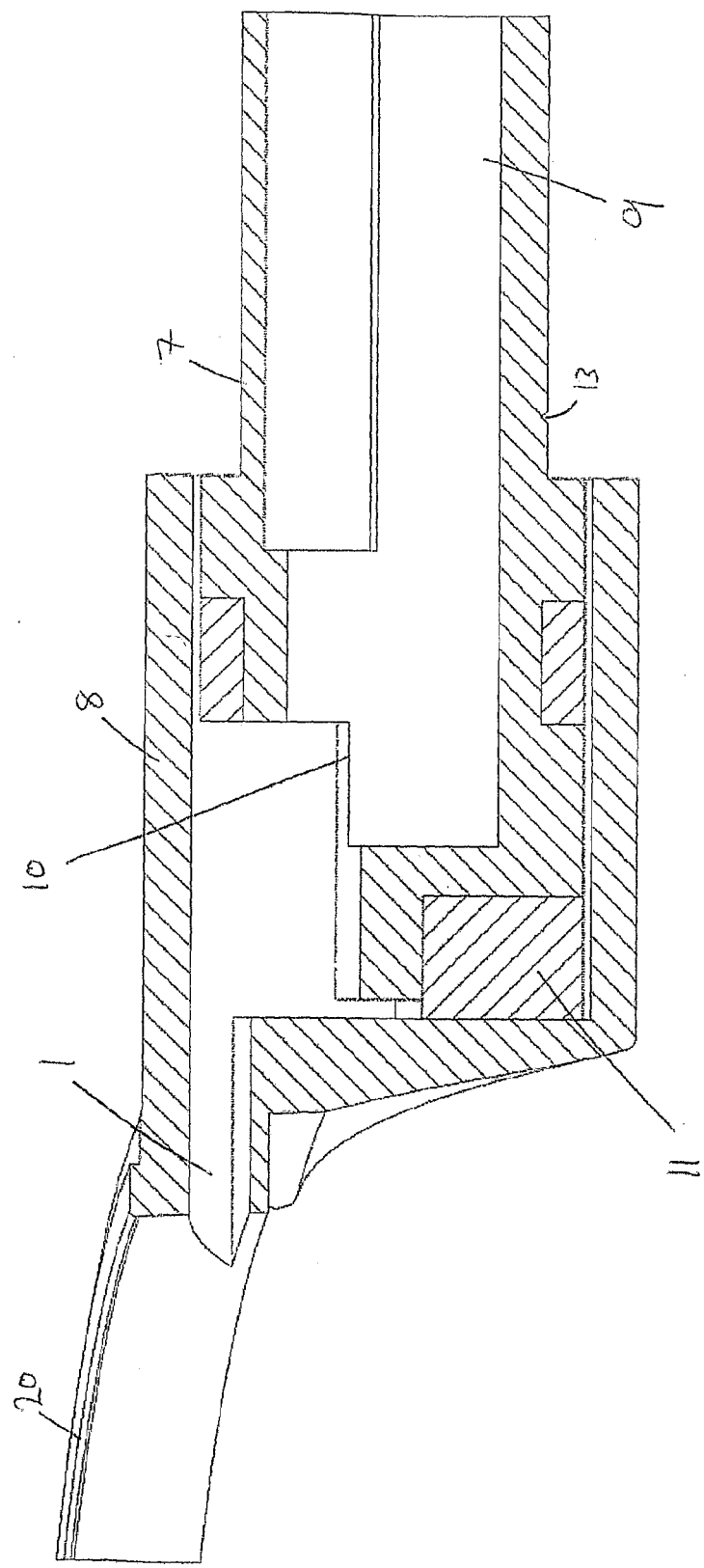
FIG. 2 shows a close-up of the sealing apparatus of FIG. 1.

Detail of the shape of the valve member 7 can be best seen in FIG. 2. This Figure shows an enlarged view of the sealing apparatus 6 components of FIG. 1, with the barrel 3 and lens covers 50, 60 omitted. The valve member 7 is arranged to rotate within the valve chamber 8, and includes a bore 9, which joins to the bore 5. Fluid can pass from the reservoir 4 via the bore 5 to a inlet of the bore 9. The fluid passes via the bore 9 along the valve member 7 and into the first end of the valve chamber 8 through a hole 10 in the end of the valve member 7. The valve member 7 is generally cylindrical, and at the end of the valve which is fitted into the first end of the valve chamber 8, the cylinder has a cut-away portion that allows fluid to pass from the hole 10 to the hole 1. The portion of the valve member 7 which is not cut-away forms a seal 11. The cut-away portion and seal 11 thus form a rotating valve when mounted within the valve chamber 8.

In FIGS. 1 and 2 the valve member 7 is shown in the open position, with the cut-away portion adjacent the hole 1 into the cavity. To close the valve, the valve member 7 is rotated until the seal 11 is adjacent the hole 1. When the seal 11 blocks the hole 1 fluid cannot enter or exit the lens cavity.

The valve member 7 is rotated by a lever 12, which in this embodiment is formed integrally with the barrel 3. The lever 12 is joined to the valve member 7 by connection of the outer circumference of the valve member 7 with the inner circumference of the bore 5. This can be a friction fit, or the connection may be secured using glue, ultrasonic welding or any other suitable technique.

The valve chamber 8 includes a stop (not shown) that is provided so that the operator can feel when the valve is in the closed and open positions, and which stops the valve member in the desired place. When the valve is opened the stop acts against the turning force of the dial 2 as it is tightened. The lever 12 can be used to prevent turning of the valve member 7 when the dial is loosened. When the valve member 7 is rotated around to the closed position and hits the stop, then further force on the lever 12 will enable the operator to disconnect the reservoir 4 from the lens.

The disconnection occurs by breaking the valve member 7 at a point behind the seal 11, enabling the reservoir 4 to be removed, along with the lever 12 and barrel 3. The connection between the valve member 7 and the barrel 3 can be seen in FIGS. 3 and 4, and the valve member 7 is shown in detail in FIG. 5. A cut or notch 13 is provided to form a stress concentrator and hence initiate failure of the valve material to disconnect the lever 12 and reservoir 4. A retaining ring 14, which can be seen in FIG. 1, is provided to keep the valve end of the valve member 7 secured in place within the valve chamber 8 during and after the disconnection. The retaining ring 14 is connected to the outer surface of the valve chamber 8 by a screw thread, and has an inwardly extending flange that locates against a step about the circumference of the valve member 7. A moment applied about an axis normal to the axis of rotation and passing through the notch 13 will cause high tensile stress at the notch 13 and the valve member 7 will thus fail around the bore 9 adjacent the notch 13. The lever 12, barrel 3 and dial 2 can then be taken off the lens. The valve end of the valve member 7, with the seal 11 closing the hole 1, is kept in place and held by the retaining ring 14.

Figure 3:
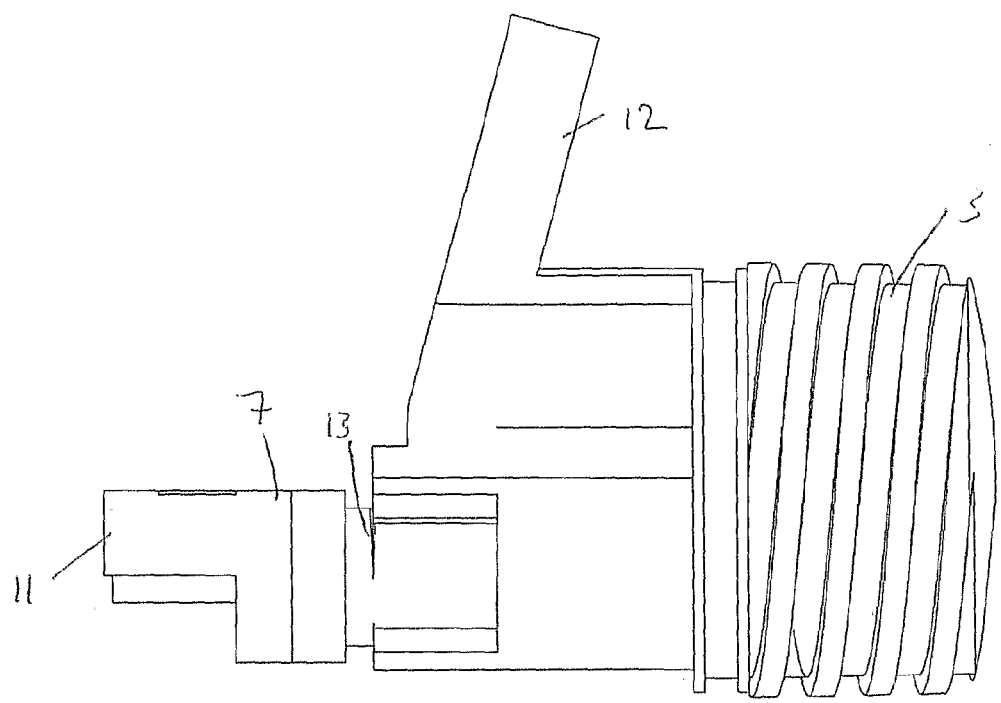
FIG. 3 shows the mechanism of FIG. 1 with the adjustment dial, lens and valve chamber not shown.
Figure 4:
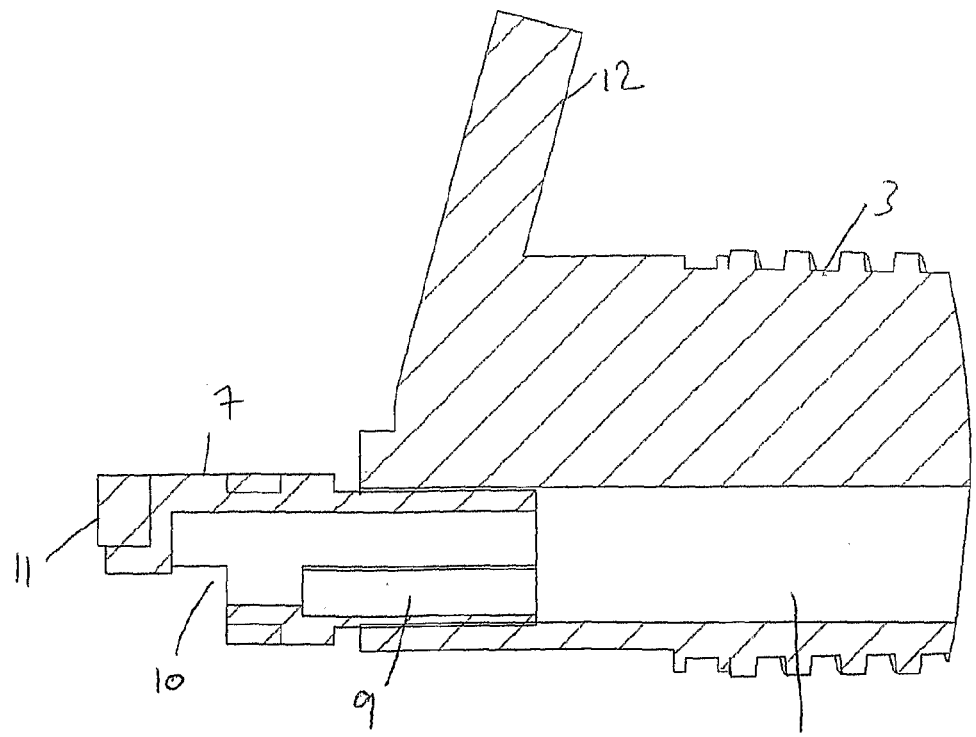
FIG. 4 is a cross-sectional view of the parts shown in FIG. 3.
Figure 5:
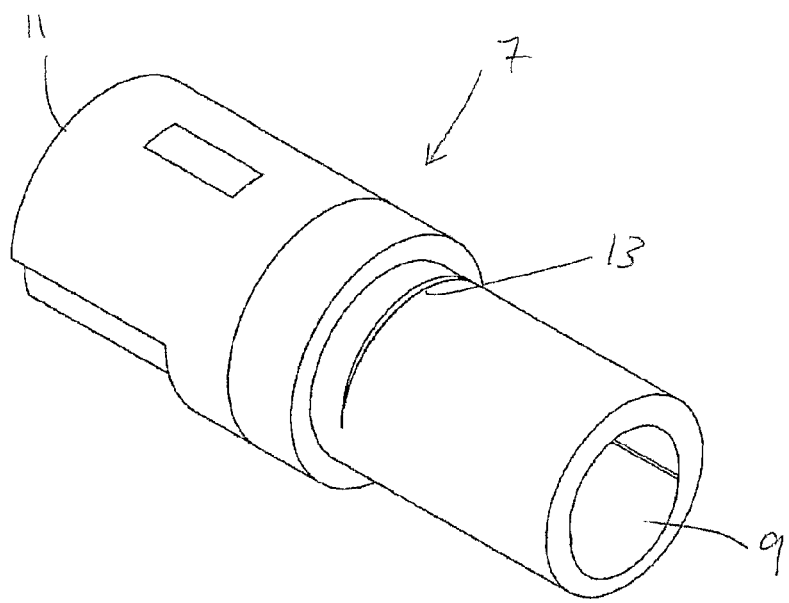
FIG. 5 shows the detail of the valve member.

As can be seen from FIGS. 3 to 5, the notch 13 is a cut extending around about half of the circumference of the valve member. In addition to the notch 13, the valve member 7 has a varying wall thickness about the bore 9. This is thicker at the top (as orientated in FIG. 5) to allow the notch 13 to be formed, and thinner around the lower edge to facilitate breaking of the valve member 7 and easy removal of the reservoir 4 and related parts. The varying wall thickness of the bore 9 can be seen in cross-section FIGS. 1, 2 and 4, where valve member 7 is shown with the thinner wall at the top edge of the valve member 7 and the thicker wall and notch 13 at the bottom edge. The particular arrangement of varying wall thickness in FIGS. 3 to 5 is not essential, but instead any arrangement to promote circumferential failure of the valve member 7 can be used. For example, the wall thickness around the notch 13 may be reduced to promote generation of a full-thickness crack.

Figure 6:
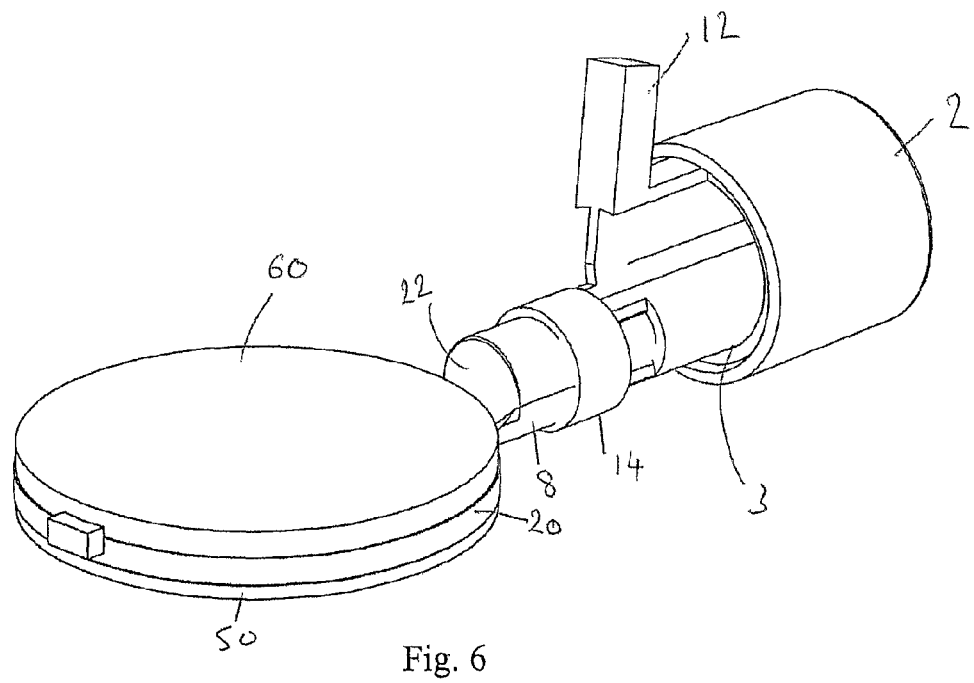
FIG. 6 shows a perspective view of the mechanism of FIG. 1 attached to a lens.
Figure 7:
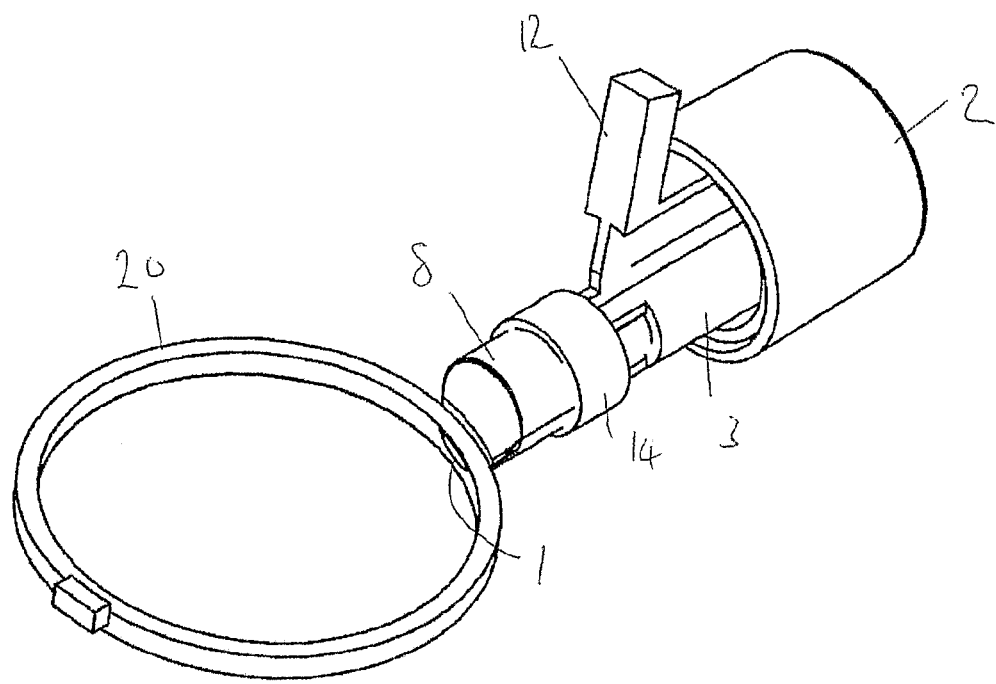
FIG. 7 shows the same view as FIG. 6, with the lens covers and membrane omitted.
Figure 8:
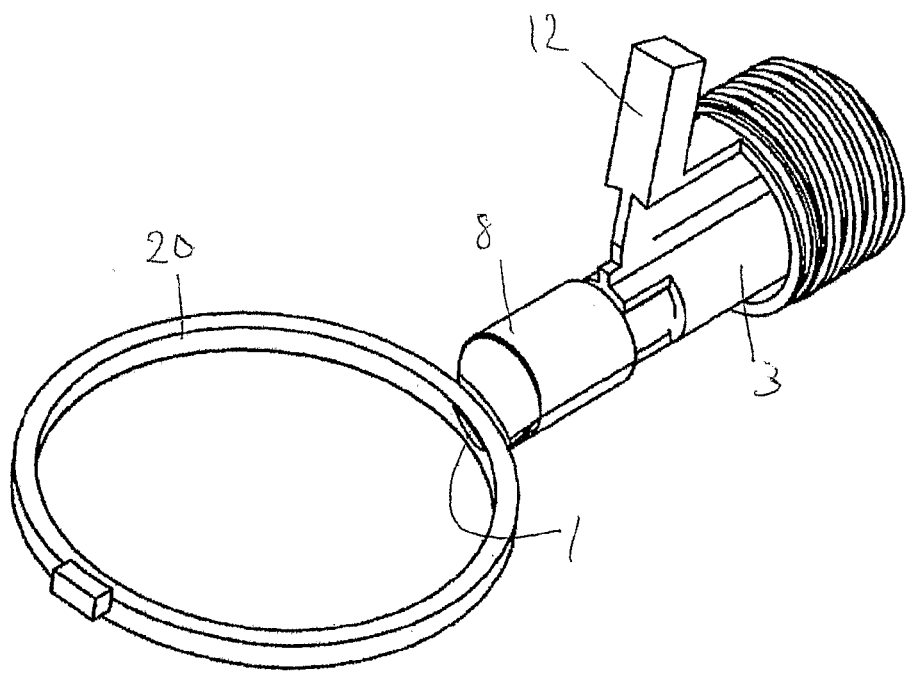
FIG. 8 shows a similar view with the adjustment dial removed.

FIG. 6 shows the adjustment and sealing mechanism attached to a variable lens. The lens would be inserted into an appropriate spectacle frame with the arm of the spectacles extending from a hinge connection point adjacent to the valve chamber 8 and retaining ring 14. The lever 12 is situated just beyond this hinge connection point. The dial 2 is further out. The user can easily adjust the lens by turning the dial 2. This twisting motion will be adjacent the temples when the spectacles are worn, and has been found to be ergonomic and intuitive for the wearer, and is also easy and convenient for another person to do. The positioning of an adjustment mechanism by the temples can be seen from FIG. 11, which shows spectacles with a fine adjustment mechanism. When the lens is at the desired power the lever 12 is turned to close the valve and further force is applied to the lever 12 to break the valve member 7 using the notch 13 and disconnect the reservoir section of the mechanism. FIG. 7 shows the same arrangement with the lens covers 50, 60 not present, which means that the hole 1 into the lens cavity can be seen. Adjustment of the dial 2 will move fluid into or out of the hole 1. FIG. 8 shows the same view with the dial 2 omitted, showing detail of the thread of the barrel 3.

As will be appreciated from FIGS. 6 to 8, if it were not possible to disconnect the reservoir then the spectacles would be cumbersome and ungainly due to the large adjustment device protruding from the lens.

Assembly of the valve device and the adjustment mechanism proceeds as follows. The lens is formed in any suitable manner, as are the various components of the valve device and the adjustment mechanism. A convenient method for most of the components is injection moulding of a suitable plastic. The flexible membrane can be cut from a sheet. The seal 11 is formed on the valve member 7. The seal 11 is of a more resilient material than the valve member 7 in order to provide a better closure of the outlet to the hole 1. The notch 13 is formed in the valve member 7 by cutting or the like. The valve member 7 is inserted into the valve chamber 8 of the lens ring 20. A seal (not shown) about the valve member 7 is used for sealing engagement between the valve member 7 and the valve chamber 8. The retaining ring 14 is threaded onto the outer surface of the valve chamber 8 and engages with a step on the valve member 7 to retain it within the valve chamber 8. The barrel 3 and lever part is then fitted onto the valve member 7, with the valve member 7 within the bore 5 of the barrel 3. This joint can be secured by suitable methods, as discussed above. The dial 2 can then be screwed onto the barrel. A seal about the barrel 3 provides a sealing engagement with the dial 2 to form a sealed reservoir.

Filling the lens cavity and the adjustment mechanism with fluid may be accomplished in two ways. In the first method the lens is filled before the valve member is inserted, whereas in the second method the lens is empty. In both methods the lens and its valve member 7 (once inserted) are secured into the spectacles frame before the reservoir parts are attached. The lens and valve member 7 are secured with the aid of a retaining ring, which can be the retaining ring 14 discussed above, or may be a further retaining ring that fixes to a thread on the spectacles frame.

Method One:
1. The lens cavity and a portion of the valve chamber 8 are pre-filled.
2. The valve member 7 is placed into the valve chamber 8, which displaces fluid up through the valve opening 10 and into the valves bore 9.
3. The barrel and dial assembly containing the external fluid reservoir 4 is attached onto the valve member 7 (and fixed on with any suitable method).
4. A needle is inserted into the external fluid reservoir 4 from an entry port in the end cap of the dial 2 that is aligned axially with the valve member bore 5 and barrel bore 9, and fills the void with fluid. Ideally the needle should start passing fluid once its tip is under the level of the existing fluid in the valve member bore 9.
5. Filling continues until a positive meniscus is formed at the entry port in the external reservoir 4.

Method Two:
1. A suitable volume of the lens cavity, the port 1 between the lens cavity and the barrel 3, the bore opening 10 in the valve member 7 and an entry port at the end of the external fluid reservoir 4 are all aligned on a vertical axis.

2. A needle is inserted along said vertical axis and fills the lens cavity, the valve member 7 and the external reservoir 4 in one filling process.
3. Filling continues until a positive meniscus is formed at the entry port in the external reservoir 4.

In both methods, the entry port is then sealed with a conventional bung/stopper/grub screw or some other suitable sealing method, although this may lead to some fluid spillage. Alternatively, the sealing can be accomplished with a suitably-designed mushroom-shaped bung, which seals the port with a barbed shaft and has a mushroom shaped head with a hollow internal cavity that encloses the positive meniscus at the entry port.

Exemplary embodiments of the lens arrangement include one or more vents (not shown) to aid evacuation of air from the lens cavity as it is filled. The vents are placed beside the port 1 and thus are at the top of the lens cavity during filling. Once any air bubble has been eliminated, the vent is filled with a plug and then sealed. The plug can be an interference fit without additional sealing, or it can be sealed by any suitable means such as laser welding or adhesive.

As will be appreciated, FIGS. 1 to 8 show a lens for one eye only. Whilst an identical lens and valve device could be used for both eyes, it is exemplary to use a mirror image on the other eye. This means that the directions of rotation of the dial 2 and the valve member 7 will be reversed relative to the lens structure. The reason for this is to make the absolute direction of rotation of the dial 2 and the valve member 7 the same when the lenses are mounted in a spectacles frame. For example, a rotation that moves the top of the dial 2 forward can be used to tighten the dial 2. This requires a right handed thread on one side of the spectacles and a left handed thread on the other side.

Figure 9:
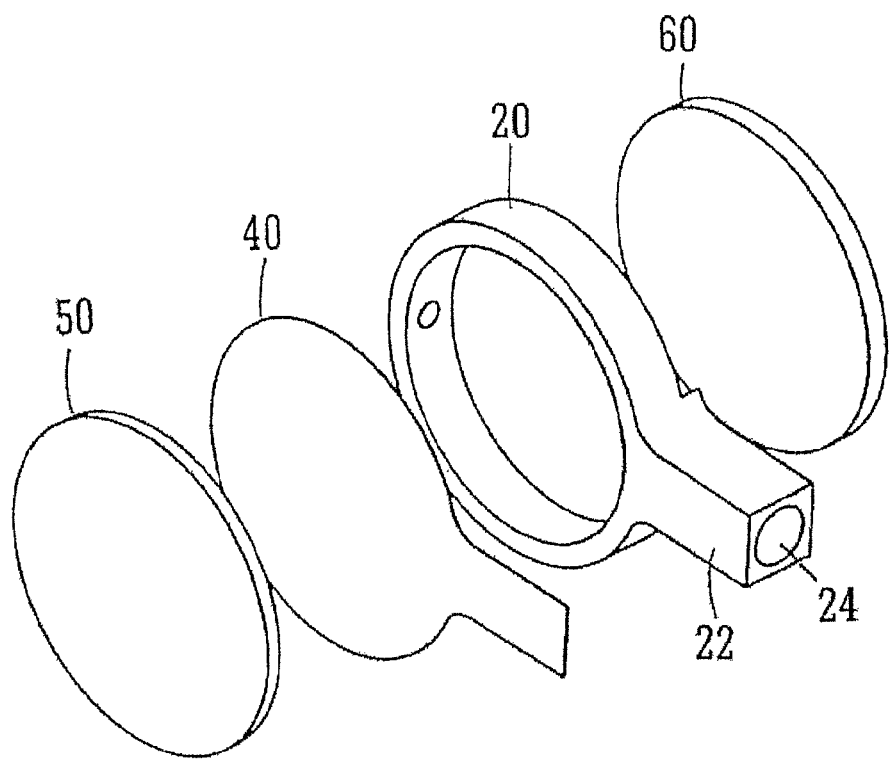
FIG. 9 shows an exploded view of a lens structure of the type used with the disclosure.

FIG. 9 shows an exploded view of a lens of the type that can be used with the mechanism of the other Figures. The lens has a plastic ring 20, with an integral extension 22 having a hollow bore 24 therein, which forms the valve chamber 8 as in FIG. 1. The rear cover 60 is attached to the rear of the ring 20, and a flexible membrane 40 is attached to the front of the ring 20. The ring 20, the rear cover 60 and the flexible membrane 40 between them form a cavity which is filled with liquid; further liquid can be introduced into and removed from the cavity to deform the flexible membrane 40 and thus adjust the power of the lens. The front cover 50 is attached over the flexible membrane 40 for protection.

In an embodiment that is not shown, the sealing and adjustment mechanism of FIGS. 1 to 8 (or of any of the second to fourth embodiments described below) is installed in combination with a secondary adjustment mechanism, which is for fine adjustment. The fine adjustment mechanism is installed between the valve chamber 8 and the lens ring 20 and enables adjustment of the variable lens after the main reservoir 4 has been removed.

In an embodiment of a suitable fine adjustment mechanism, the hollow bore 24 of the extension 22 on the lens is extended to serve both as a secondary reservoir and as the valve chamber 8. The secondary reservoir contains a small amount of liquid which can be used to vary the power of the lens. A piston or the like is arranged to move within the secondary reservoir, to change the volume of the secondary reservoir and move liquid into or out of the cavity, and an adjuster means is coupled to the piston, such that rotation of the adjuster means causes the piston to move within the secondary reservoir. The adjuster means can be a ring extending around the extension 22, arranged to move the piston using a suitable arrangement of screw threads.

Figure 10:
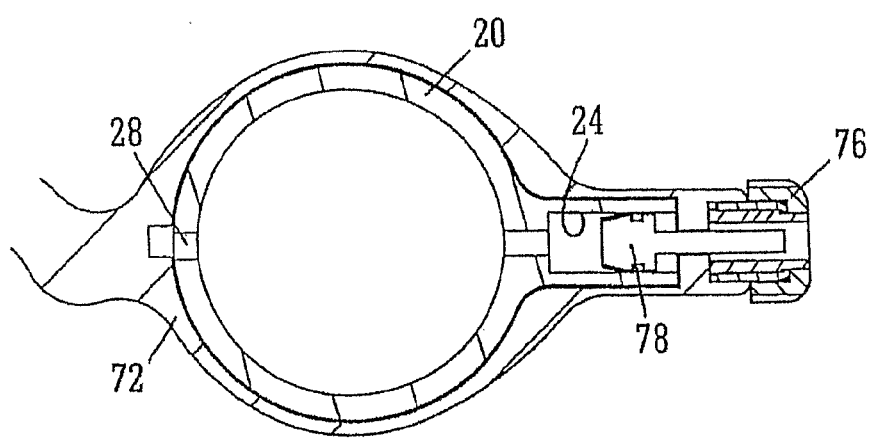
FIG. 10 is a cross-section of the lens structure of FIG. 9 when mounted in a spectacles frame with a fine adjustment mechanism.
Figure 14:
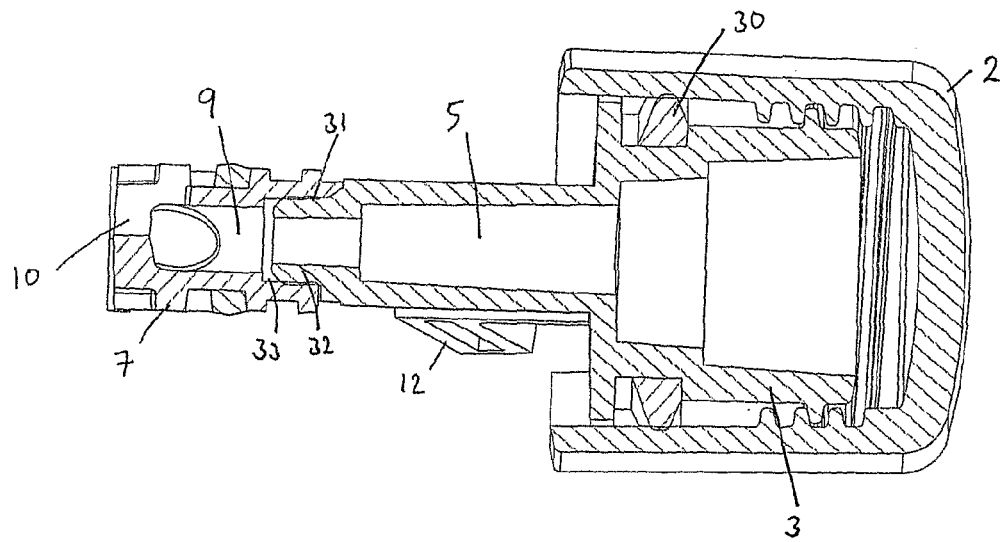
FIG. 14 is a cross-section along A-A in FIG. 12.

An example of a fine adjustment mechanism that could be used in combination with the adjustment mechanism of any of the first to fourth embodiments is shown in FIGS. 10 and 11. The lens structure corresponds to that shown in FIG. 9. The hollow bore 24 communicates with the space inside the ring 22 by means of a passage 26. The hollow bore 24 serves as the secondary reservoir, allowing liquid to be added into or removed from the cavity through the passage 26 to vary the shape of the flexible membrane 40 and thus the optical characteristics of the lens. The hollow bore 24 also accommodates an adjustment mechanism for varying the amount of fluid in the cavity.

Opposite the extension 22, a fill hole 28 is formed through the ring 20. This fill hole 28 is used to fill the cavity and the reservoir after assembly of the lens, and is subsequently sealed.

The adjustment mechanism is shown in cross-section in FIG. 10. A plunger 78 can move along the bore 24, thus acting as a piston in a cylinder. Motion of the plunger 78 towards the ring 22 forces liquid into the cavity, and motion of the plunger 78 away from the ring 22 withdraws liquid from the cavity. Changing the amount of liquid in the cavity changes the curvature of the flexible membrane 40, and thus the optical characteristics of the lens 10.

The plunger 78 is operatively connected to a handwheel or knob 76. The handwheel 76 is mounted such that it can rotate, but cannot move along its axis of rotation. Rotational movement of the handwheel is converted into translational movement of the plunger 78 by means of a threaded connection.

FIG. 11 shows a pair of spectacles 70 made using two lenses as in FIG. 10. The lens on the right of FIG. 11 is in the same orientation as in FIG. 10, the lens on the left is a mirror image of that on the right, and has been rotated by 180 degrees about its optical axis. The lenses are arranged such that the radial extensions 22 extend horizontally, from the outer edge of the user's eye.

The lenses are fitted into a frame 72, to which sidearms 74 are attached. Further, handwheels 76 are attached to each side of the frame 72, and each of these handwheels 76 is connected to an adjustment mechanism which allows the focus of the lens 10 to be varied. The adjustment mechanism on the right is as in FIG. 10, and the adjustment mechanism on the left is a mirror image of that in FIG. 10, with the direction of the screw threads reversed. This reversal means that the two handwheels are rotated in the same direction to achieve an increase or decrease of lens power.

As will be appreciated some adaptation of the fine adjustment mechanism of FIGS. 10 and 11 is required to allow it to be combined with the larger reservoir 4 of any of the first to fourth embodiments. In one embodiment a hole (not shown) extends through the handwheel 76 and piston 78 axially along the secondary reservoir, offset from the centre of the piston 78 and this hole opens at the handwheel 76 into a valve chamber 8 as described above. Thus, the valve member 7 abuts a face of the handwheel 76, and the hole in the handwheel takes the place of the hole 1 in the arrangement of any of the first to fourth embodiments. The connection from the main reservoir 4 to the lens cavity is along the bores 5 and 9, and then along the hole in the piston and handwheel 76 to the second reservoir. The valve chamber 8 is joined to the handwheel 76 and is arranged such that when the valve is closed, the hole in the end of the handwheel 76 is sealed.

In an alternative embodiment, the outlet from the valve chamber 8 opens into the secondary reservoir or a conduit connected thereto, and the piston 78 moves into the secondary reservoir from the opposite end of the reservoir, or from a side of the reservoir. Thus, the connection from the outlet of the valve chamber 8 could be into the side of the secondary reservoir, for example from top or bottom of the bore 24 as viewed in FIG. 10. Alternatively, the handwheel 76 and piston 78 could be rotated by 90 degrees so as to be vertical in FIG. 10, with the valve chamber connected from the right hand side of FIG. 10. This type of connection avoids the need for a hole through the piston 78 and/or handwheel 76.

Thus, with this arrangement, a large adjustment of the lens can be carried out using the dial 2 and main reservoir 4, with fluid passing through the secondary reservoir of the fine adjustment mechanism. When the appropriate large adjustment is completed, the valve member 7 is turned to seal the hole connecting the valve chamber 8 to the secondary reservoir, and the large reservoir 4 is disconnected, as set out above. The fluid remaining in the second reservoir can be moved in and out of the cavity in the lens by the fine adjustment piston 78.

Figure 15:
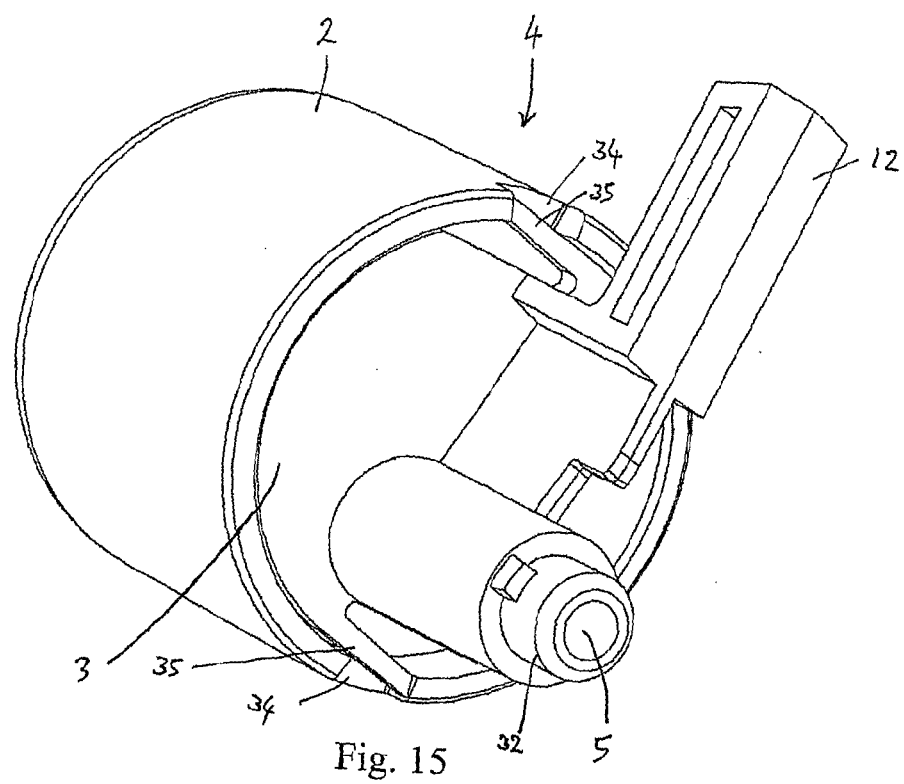
FIG. 15 shows the reservoir of the mechanism of FIG. 12 when detached from the valve member.
Figure 16:
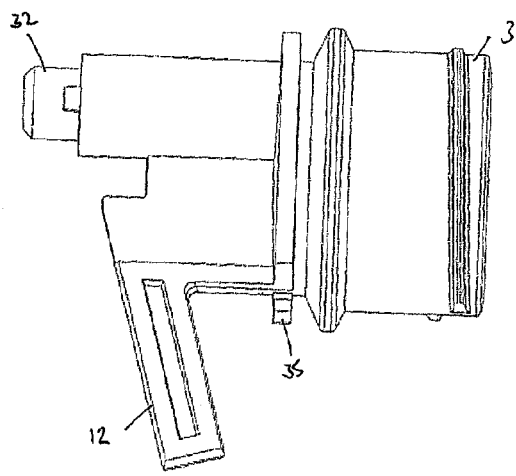
FIGS. 16 to 18 are various views of the barrel of the mechanism of FIG. 12.
Figure 17:
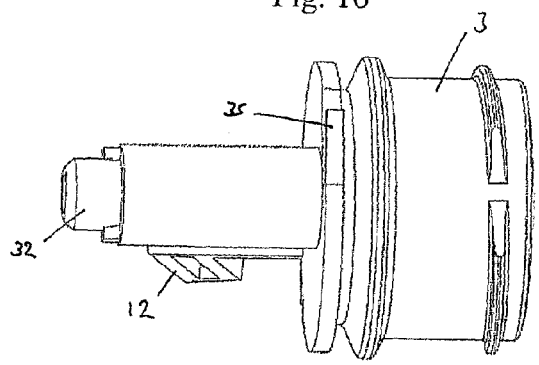

FIGS. 12 to 18 illustrate a second embodiment that utilises an alternative mechanism for disengaging the reservoir 4 from the valve member 7. Other features of the adjustment mechanism are similar to those described in relation to FIGS. 1 to 8, and this description is hence not repeated here. It will be noted however that this second embodiment utilises only a single turn screw thread on the barrel 3, compared to several turns on the barrel 3 of the first embodiment. It has been found that this arrangement, in combination with a seal 30 provides sufficient stability and guidance for adjustment of the lens using the dial 2. By having only a single turn of thread evacuation of air during the filling process is made easier. To further aid the evacuation of air, part of the thread is omitted to allow for a ridge-free path for air evacuation. The incomplete thread is shown in FIG. 17. It will however be appreciated that either arrangement of threads can be used as desired.

As can be seen in FIG. 12, the second embodiment does not include a notch 13 on the valve member 7 for breaking the valve member. Instead, the reservoir 4 and the valve member 7 are joined by a friction fit joint 31. The joint 31 is formed by engagement of a plug 32 extending from the barrel 3 with a socket 33 formed in the valve member 7. The plug 32 is prevented from rotating in the socket 33 by a lug which engages in a notch. The detail of this arrangement can be seen with reference to FIGS. 13 and 14. Hence, the dial 2 can be rotated about the barrel 3 without slippage of the plug 32 within the socket 33. In addition, a greater force can be applied to the lever 12, which is integrally formed with the barrel 3, when rotating the valve member 7 within the valve chamber 8 (not shown in this embodiment) in order to seal the lens cavity.

When the lens power is adjusted satisfactorily, the valve is closed by rotating the lever, and the reservoir 4 is removed by a simple pulling motion, which replaces the step of breaking the valve member 7 at the notch 13. Advantageously, this enables the reservoir 4 to be reconnected, or a new reservoir 4 can be used.

FIG. 15 shows the reservoir 4 removed from the valve member 7. The lug on the socket 32 can easily be seen. FIG. 15 also illustrates a further feature which is found in the second embodiment. The cup shaped dial 2 is provided with notches 34 on the periphery of its open end, and the barrel 3 includes flexible barbs 35. During normal use, the barbs 35 are held inside the dial 2, and push against the inner surface of the dial. However, if the dial 2 is wound out too much, the barbs 35 spring outward into the notches 34. This prevents further rotation in that direction. FIG. 15 shows the barbs 35 engaged with the notches 34.

Figure 18:
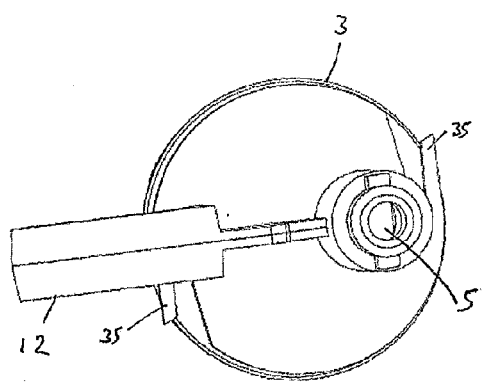

The barbs 35 and notches 34 hence form a stop to set a point of maximum movement of the dial 2. If rotation of the dial 2 is reversed, then the barbs 35 are eased back into position by the opposite inside edge of the notches 34 so that the dial 2 can be adjusted as normal. FIGS. 16 to 18 show the reservoir 4 with the dial 2 removed. Additional detail of the socket 32 can be seen, and the structure of the barbs 35 is also evident. The barbs 35 consist of thin flexible portions with an outer edge that extends approximately at a tangent to the circumference of the barrel 3.

Whilst the addition of this stopping mechanism is shown in relation to the second embodiment, it will be appreciated that these features could also be provided on the barrel 3 and dial 2 of the first embodiment, to achieve the same effect.

Figure 19:
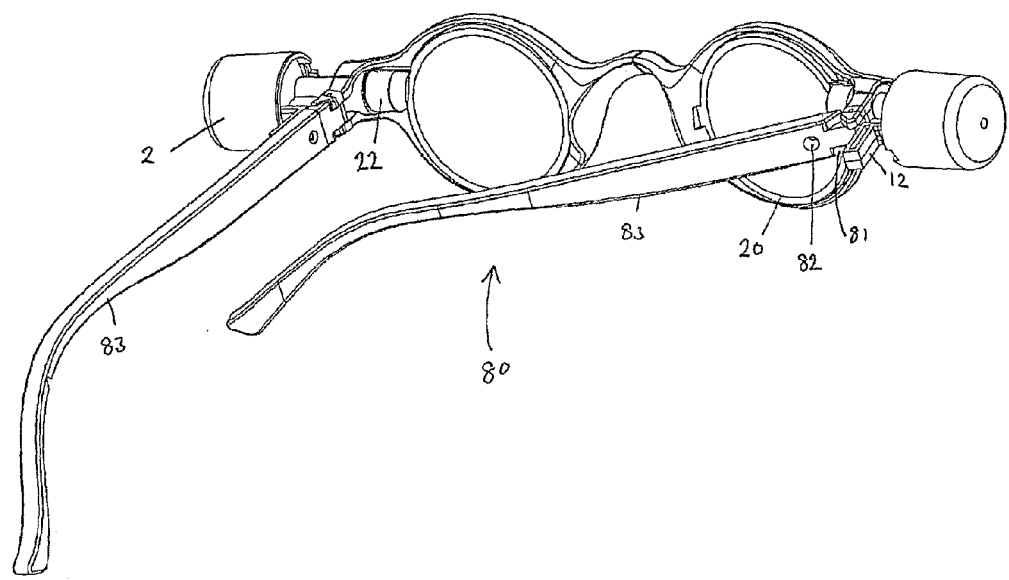
FIGS. 19 and 20 show spectacles including a third embodiment of an adjustment and sealing mechanism in a perspective and a plan view.
Figure 20:
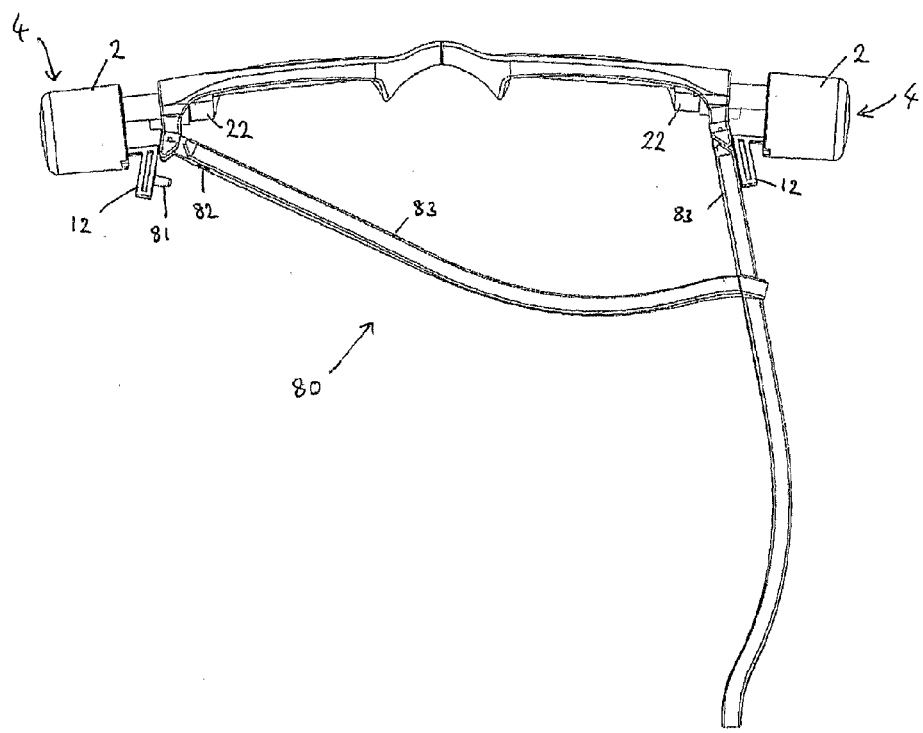

A further additional feature is shown in the third embodiment of FIGS. 19 and 20, which each show a pair of spectacles 80, with a reservoir 4 attached to either lens. The reservoir 4 and valve member 7 in this embodiment corresponds to that shown in FIGS. 12 to 18, although the additional features described below could be used in combination with the reservoir 4 and valve member 7 of FIGS. 1 to 8 if desired.

The third embodiment includes a spike 81 projecting out of the lever 12 and a corresponding cavity 82 in the arm 83 of the spectacles 80. When the side arm 83 is in the open position, the spike 81 sits in the cavity 82. This prevents unwanted turning of the lever 12 and hence of the valve member 7 around its axis of rotation whilst the dials 2 are being turned by the user during the lens power-adjustment process. This assists in the lens adjustment procedure by preventing premature operation of the valve device 6. To enable the lever 12 to be rotated to actuate the valve the side arm 83 is closed to remove the spike 81 from the cavity 82. Thus, in FIG. 20 for example the lever 12 of the left hand reservoir 4 can be turned, but the lever 12 of the right hand reservoir 4 is fixed in place due to engagement of the spike 81 with the cavity 82. The spike 81 and/or cavity 82 has a tapered profile to guide the engagement of the lever 12 with the arm 83. This lets the mechanism cope with slight misalignments.

Figure 21:
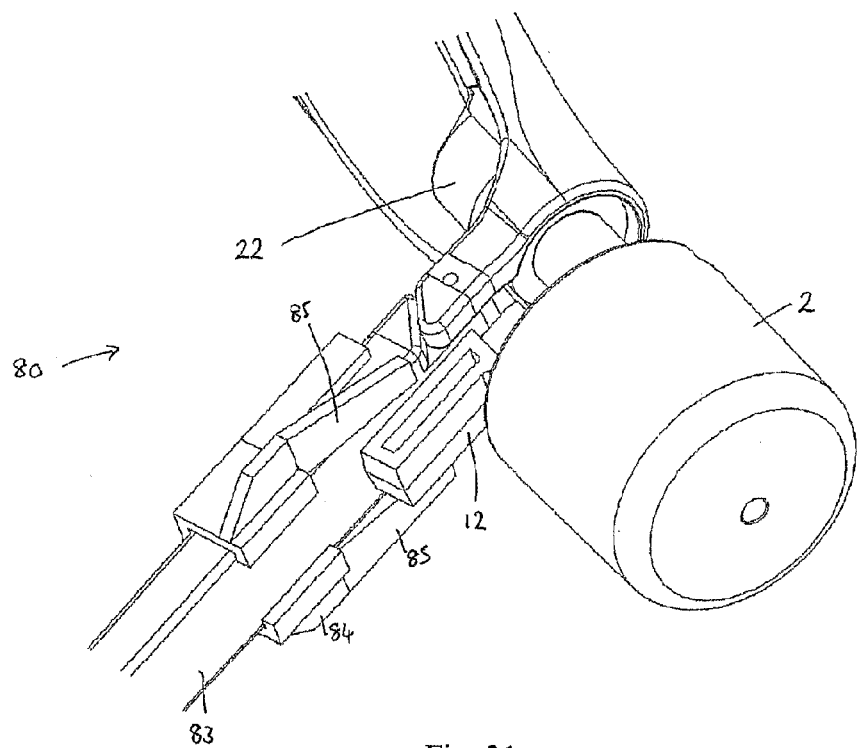
FIG. 21 is a close up view of a clip on a sidearm of a pair of spectacles, which is a feature of a fourth embodiment of an adjustment and sealing mechanism.
Figure 22:
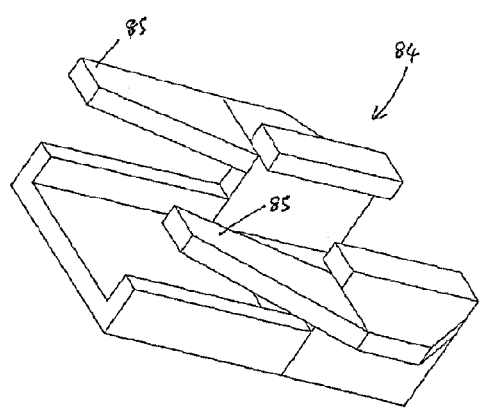
FIG. 22 is a perspective view of the clip of FIG. 21.

FIGS. 21 and 22 show a further embodiment, which utilises an alternative mechanism for preventing unwanted movement of the lever 12. FIG. 21 is a close up view of spectacles 80 showing detail of the interaction between the lever 12 and the arm 83 of the spectacles. In this embodiment, a clip 84 is mounted on the side arm 83, and the clip 84 includes flexible projections 85 that extend along either side of the lever 12 when the lever 12 is aligned with the side arm 83. The clip 84 can be seen in more detail in FIG. 22. If a spike 81 and cavity 82 is used as in FIGS. 19 and 20, then when the lever 12 is not correctly placed the spike 81 can jam against the side arm 83 causing damage to the spectacles and possibly prematurely disengaging the reservoir 4. With the clip 84, if the lever 12 is incorrectly placed then it will deflect the projections 85 without any damage, and will not jam against the side arms 83. The lever 12 can then be rotated into the correct position with the side arms either opened or closed. The clip 85 can be taken off the side arm 83 by sliding it along the length of the side arm 83.

It will be appreciated that various forms of lens can also be used with the adjustment mechanisms described herein. For example, the lens of FIGS. 1 to 8 differs slightly from the lens of FIG. 9 in that it has a valve chamber 8 with a cylindrical outer profile instead of a square profile of the extension 22 in FIG. 9. Further, the lens could include two membranes, one on either side of the cavity. The lens could be a non-circular lens. Any suitable lens construction can be used without affecting the advantages provided by the valve device and associated adjustment mechanisms.

Further, the construction of the various parts of the sealing and adjustment mechanism can vary. In the embodiments discussed above the barrel 3 and lever 12 are a single component, and the valve member 7 is a separate component. However, the lever 12 could instead be integrally formed with the valve member 7, and this component then joined to the barrel 3, or a single piece could form all three parts. Instead of a lever 12, a ring or handwheel about the barrel 3 or valve member 7 could be used to actuate the valve and disconnect the reservoir 4.

The invention claimed is:

1. A valve device for a variable lens, the device comprising:
    an inlet for receiving fluid from a reservoir;
    an outlet for passing fluid to a lens cavity; and
    a valve member, the valve member comprising a passageway for fluid communication between the inlet and outlet and a valve for closing the passageway;
        wherein the valve is actuated by turning the valve member about an axis of rotation and the passageway extends along the valve member in the axial direction.

2. The valve device as claimed in claim 1, wherein the valve member is arranged to be disconnected from the reservoir at a point on the inlet side of the valve.

3. The valve device as claimed in claim 2, wherein the valve member includes a plug or socket for releasable friction fit with a complimentary socket or plug on the reservoir.

4. The valve device as claimed in claim 1, wherein at least one of the inlet and a portion of the passageway is/are formed of a bore along the valve member in the axial direction thereof.

5. The valve device as claimed in claim 1, wherein the valve member is a cylindrical valve member mounted within a cylindrical valve chamber.

6. The valve device as claimed in claim 5, wherein the outlet is in the valve chamber.

7. The valve device as claimed in claim 5, wherein the valve chamber is formed integrally with the lens structure.

8. The valve device as claimed in claim 5, wherein the cylindrical valve member comprises:
    a cut-away section, a valve seal and a bore that forms a part of the passageway and provides fluid communication between the inlet and the cut-away section of the cylinder, wherein the cut-away section and valve seal are at an end of the cylinder located within the valve chamber.

9. The valve device as claimed in claim 8, wherein the outlet is formed in an end face of the valve chamber, and is placed offset from centre of rotation of the valve member so as to be adjacent to the cut-away section when the valve member is in an open state, and covered by the valve seal when the valve member is rotated to a closed state.

10. The valve device as claimed in claim 1, comprising a stop provided to prevent full rotation of the valve member, and to positively locate the valve in its open and/or closed state.

11. The valve device as claimed in claim 1, comprising a grip or lever for applying rotational force to the valve member.

12. The valve device as claimed in claim 11, comprising a locking means for preventing unwanted movement of the grip or lever.

13. The valve device as claimed in claim 1, comprising a reservoir for containing fluid, the reservoir connected to the inlet.

14. The valve device as claimed in claim 13, wherein the reservoir comprises a dial for adjusting the volume of fluid in the reservoir.

15. The valve device as claimed in claim 14, comprising a stopping device for preventing over-rotation of the dial.

16. The valve device as claimed in claim 15, wherein the valve member and the dial are rotated about the same or a parallel axis.

17. The valve device as claimed in claim 14, wherein the reservoir comprises a barrel and the dial is joined to the barrel by a screw thread to produce an adjustment mechanism.

18. The valve device as claimed in claim 1 comprising a secondary reservoir connected to the outlet, and a secondary adjustment device for the adjustment of volume of the secondary reservoir thereby allowing adjustment of the lens when the valve is closed.

19. The valve device as claimed in claim 18, wherein the valve device includes a first reservoir, and the secondary reservoir is smaller than the first reservoir.

20. The valve device as claimed in claim 18, wherein the secondary adjustment device comprises a piston within the secondary reservoir, which can be moved relative to the reservoir to change the volume thereof.

* * * * *